(12) United States Patent
Li et al.

(10) Patent No.: US 12,516,835 B2
(45) Date of Patent: Jan. 6, 2026

(54) ION GENERATOR, FAN COIL UNIT AND AIR CONDITIONING SYSTEM

(71) Applicant: Carrier Corporation, Palm Beach Gardens, FL (US)

(72) Inventors: Huanan Li, Shanghai (CN); Zhiwang Guo, Shanghai (CN); Yan Yu, Shanghai (CN); Xi Feng, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 934 days.

(21) Appl. No.: 17/722,685

(22) Filed: Apr. 18, 2022

(65) Prior Publication Data

US 2022/0333804 A1  Oct. 20, 2022

(30) Foreign Application Priority Data

Apr. 19, 2021  (CN) .......................... 202110418645.7

(51) Int. Cl.
*F24F 8/30* (2021.01)
*F24F 11/88* (2018.01)
*H01J 37/08* (2006.01)

(52) U.S. Cl.
CPC ............... *F24F 8/30* (2021.01); *F24F 11/88* (2018.01); *H01J 37/08* (2013.01); *H01J 2237/208* (2013.01)

(58) Field of Classification Search
CPC .... F24F 8/30; F24F 11/88; F24F 8/192; F24F 8/133; F24F 8/175; F24F 8/20; F24F 8/194; F24F 8/98; H01J 37/08; H01J 2237/208; B03C 3/60; B03C 3/12; B03C 3/32; B03C 3/41; B03C 3/155; B03C 3/47; B03C 3/08; B03C 3/011; B03C 2201/10; B03C 3/09; B03C 3/017; B03C 3/38; B03C 3/34; B03C 2201/04; B03C 3/368; A61L 9/22; A61L 2209/16; A61L 9/16; Y02A 50/20
See application file for complete search history.

(56) References Cited

U.S. PATENT DOCUMENTS

| | | | |
|---|---|---|---|
| 2014/0205495 A1* | 7/2014 | Ota | A61L 9/22 422/4 |
| 2015/0041675 A1* | 2/2015 | Shibata | H01J 27/022 415/121.3 |
| 2015/0143839 A1* | 5/2015 | Lee | F24F 1/0076 62/426 |
| 2018/0169665 A1* | 6/2018 | Lee | B03C 3/60 |

* cited by examiner

*Primary Examiner* — Xiuyu Tai
(74) *Attorney, Agent, or Firm* — CANTOR COLBURN LLP

(57) ABSTRACT

An ion generator, a fan coil unit and an air conditioning system. The ion generator includes: a power module; a negative plate connected to the power module; a ground plate spaced apart from a first side of the negative plate, the first side of the negative plate includes a plurality of plasma needles extending toward the ground plate; a positive plate spaced apart from a second side of the negative plate, the positive plate is connected to the power module and has a polarity opposite to that of the negative plate, and the respective sides of the negative plate and the positive plate that are facing toward each other are respectively provided with a plurality of carbon fiber brushes at corresponding positions.

10 Claims, 2 Drawing Sheets

ION GENERATOR, FAN COIL UNIT AND AIR CONDITIONING SYSTEM

FOREIGN PRIORITY

This application claims priority to Chinese Patent Application No. 202110418645.7, filed Apr. 19, 2021, and all the benefits accruing therefrom under 35 U.S.C. § 119, the contents of which in its entirety are herein incorporated by reference.

TECHNICAL FIELD OF INVENTION

The present invention relates to the field of air circulation systems, in particular to an ion generator for an air conditioning system and an air conditioning system.

BACKGROUND OF THE INVENTION

Negative ions have negative charges, which can absorb dusts and other substances in the air, making them gather and fall, thereby purifying the air. Plasmas can function to sterilize the air and removing odors in the air. At present, common air purification devices generally provide one of plasmas and negative ions.

SUMMARY OF THE INVENTION

The objective of the present invention is to solve or at least alleviate the problems existing in the prior art.

According to one aspect of the present invention, an ion generator for an air circulation system is provided, which comprises: a power module; a negative plate connected to the power module; a ground plate spaced apart from a first side of the negative plate, wherein the first side of the negative plate comprises a plurality of plasma needles extending toward the ground plate; and a positive plate spaced apart from a second side of the negative plate, wherein the positive plate is connected to the power module and has a polarity opposite to that of the negative plate, and the respective sides of the negative plate and the positive plate that are facing toward each other are respectively provided with a plurality of carbon fiber brushes at corresponding positions.

Optionally, in the ion generator, the ground plate, the negative plate and the positive plate are arranged in parallel to each other.

Optionally, in the ion generator, the two ends of the ground plate, the negative plate and the positive plate are respectively connected to a first mounting bracket and a second mounting bracket, and the power module is arranged in the first mounting bracket or the second mounting bracket.

Optionally, in the ion generator, the carbon fiber brushes of the negative plate and the positive plate are gathered into bundles by carbon fiber brush protective covers.

Optionally, in the ion generator, the ground plate is made of a metal material, with openings provided thereon at corresponding positions to the plurality of plasma needles.

Optionally, in the ion generator, the positions of the plurality of plasma needles on the first side of the negative plate correspond to the positions of the plurality of carbon fiber brushes on the second side of the negative plate.

Optionally, in the ion generator, the plurality of plasma needles on the first side of the negative plate are evenly arranged at equal intervals and/or the plurality of carbon fiber brushes on the second side of the negative plate are evenly arranged at equal intervals.

Optionally, in the ion generator, the power module is configured to apply a voltage to the negative plate which is greater than the voltage applied to the positive plate, and optionally, the power module applies a voltage to the negative plate which is 1.5 to 2.5 times the voltage applied to the positive plate.

According to another aspect, a fan coil unit provided with the ion generator according to the respective embodiments is provided, wherein, in the fan coil unit, the fan coil unit comprises a middle plate, a motor mounted on the middle plate, volute(s) located on at least one side of the motor, and fan(s) located in the at least one volute(s) driven by the motor, wherein, holes are provided on the middle plate, the ion generator is mounted on the upper side of the motor mounting position on the middle plate, and the generated ions are added into the return air flow passing through the holes.

According to another aspect, an air conditioning system is provided, which comprises the fan coil unit according to the respective embodiments.

The ion generator according to the embodiments of the present invention can simultaneously generate plasmas, negative ions and positive and negative ions, has a simple structure, and is highly integrated.

BRIEF DESCRIPTION OF THE DRAWINGS

With reference to the accompanying drawings, the disclosure of the present invention will become easier to understand. Those skilled in the art would easily understand that these drawings are for the purpose of illustration, and are not intended to limit the protection scope of the present invention. In addition, in the figures, similar numerals are used to denote similar components, wherein.

DETAILED DESCRIPTION OF THE INVENTION

Figure 1:
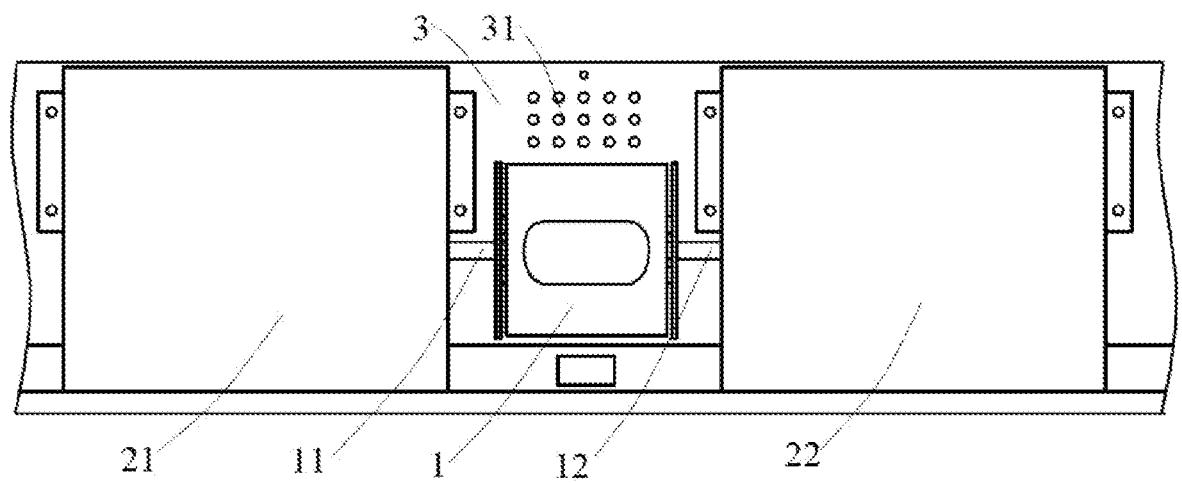
FIG. 1 is a rear view of a fan coil unit according to an embodiment of the present invention.
Figure 2:
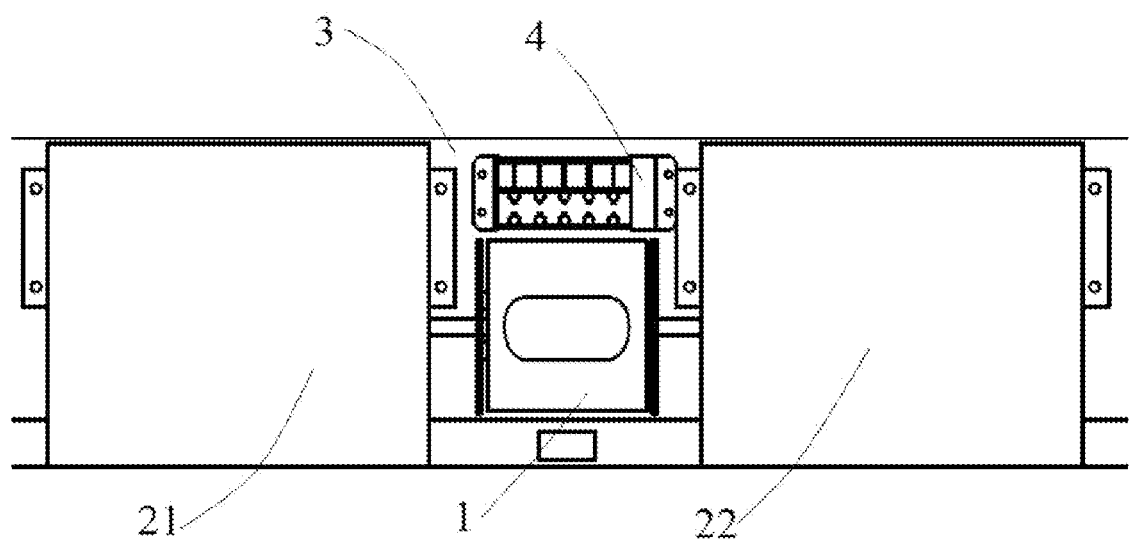
FIG. 2 is a rear view of a fan coil unit comprising an ion generator according to an embodiment of the present invention.

FIG. 1 is a rear view of a fan coil unit according to an embodiment, i.e., a view from the inner side of a middle plate 3 of a fan coil unit. The fan coil unit according to the embodiment may comprise a motor 1 provided in the middle, the motor 1 being mounted, for example, on the middle plate 3. Output shafts 11, 12 of the motor 1 can be respectively connected to fans (not shown) located in fan volutes 21, 22 on both sides of the motor, thereby driving the fans in the volutes 21, 22 to rotate, so as to send the air out of the plane defined by the middle plate 3 and sends it into the room. The volutes 21, 22 may be, for example, centrifugal fan volutes, cross-flow fan volutes, or volutes of other types of fans. Although, as shown, two volutes 21, 22 and the fans therein are provided on both sides of the motor 1, in other embodiments, however, it should be understood that there may only be a volute and a fan on one side of the motor 1. In addition to the conventional return air grille, the fan coil unit according to the embodiment of the present invention is further provided with a plurality of holes 31 on the middle plate 3, such as in a position above the motor 1 or other suitable positions. Since the air in the area on the inner side of the middle plate 3 corresponding to the plurality of holes 31 may be partially drawn away by the fans, this area will form a negative pressure and thus draw some air from the room on the outer side of the middle plate 3. As shown in FIG. 2, the ion generator 4 according to the embodiment of the present invention may be mounted to be aligned with the plurality of holes 31, whereby the ion generator 4 may add plasmas, positive and negative ions, and negative ions into the return air through the plurality of holes 31. A part of the return air may be drawn by the fans and thus participates in the indoor air circulation, and the other part of return air returns to the room through other passages, such as returning to the room through the plurality of holes 31. As mentioned, plasmas, negative ions, and positive and negative ions may function to purify the air, deodorize, and/or sterilize. It should be understood that although the ion generator according to the respective embodiments is described herein in connection with an air circulation system, particularly a fan coil of an air conditioning system, in alternative embodiments, however, the ion generator according to the embodiment may be applied to other air circulation systems, such as fresh air systems, air purifiers, and the like.

Figure 3:
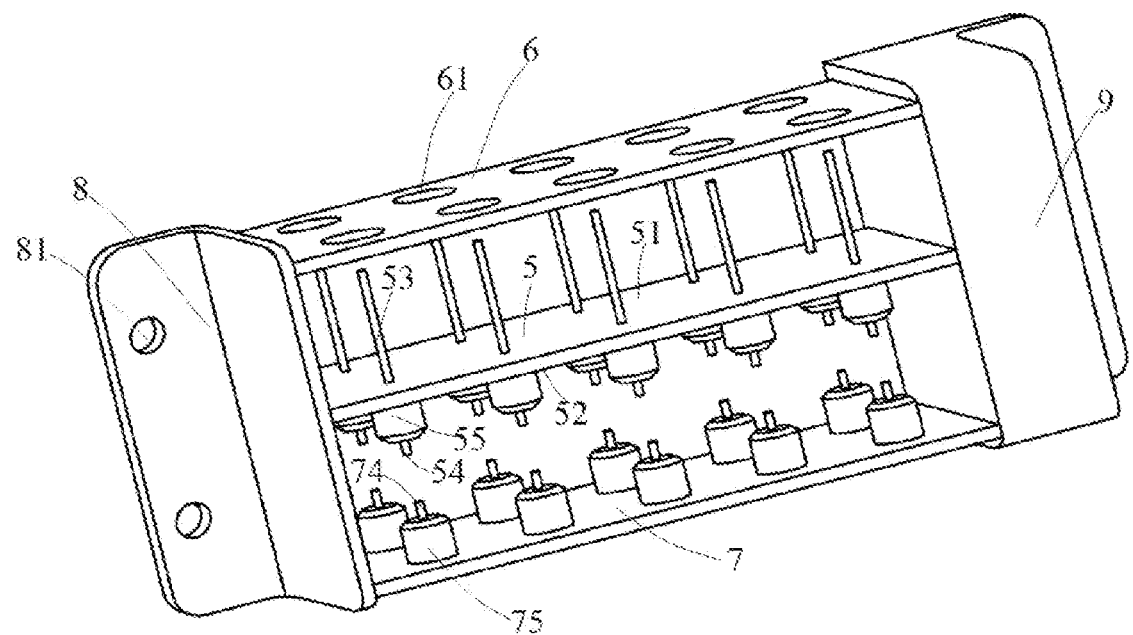
FIG. 3 is a perspective view of an ion generator according to an embodiment of the present invention.
Figure 4:
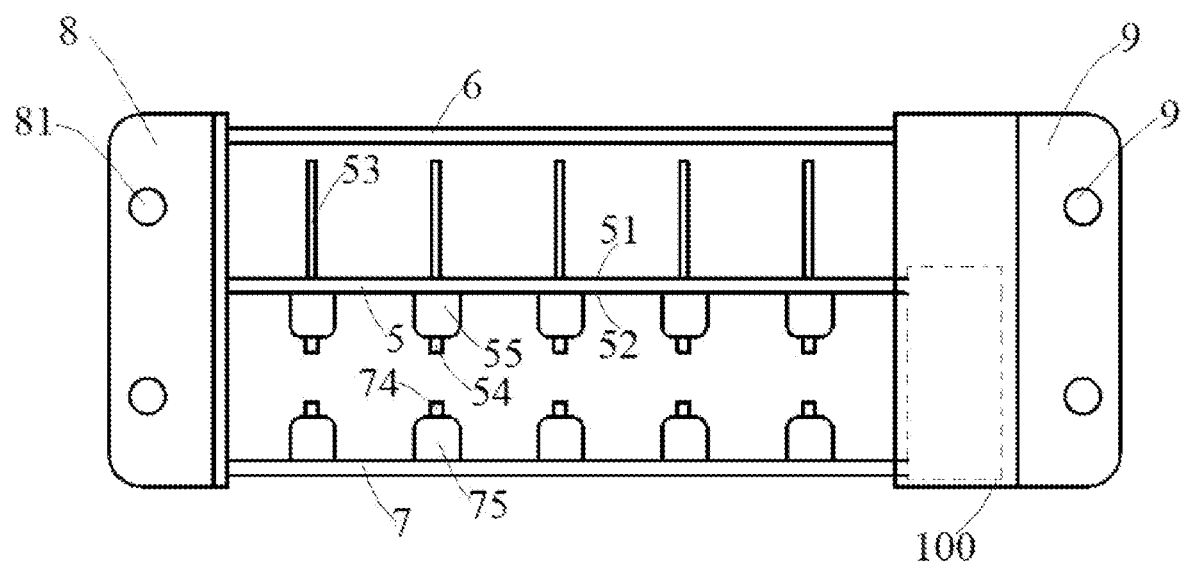
FIG. 4 is a side view of an ion generator according to an embodiment of the present invention.

An ion generator according to an embodiment of the present invention will be introduced with continued reference to FIGS. 3 and 4, which comprises: a power module 100; a negative plate 5 connected to the power module 100, wherein the negative plate 5 has a first side 51 and a second side 52; a ground plate 6 spaced apart from the first side 51 of the negative plate 5, wherein the first side 51 of the negative plate 5 comprises a plurality of plasma needles 53 extending toward the ground plate 6 but being not in contact with (spaced apart from) the ground plate 6; a positive plate 7 spaced apart from the second side 52 of the negative plate 5, wherein the positive plate 7 is connected to the power module 100 and has a polarity opposite to that of the negative plate 5, and the respective sides of the negative plate 5 and the positive plate 7 that are facing toward each other are respectively provided with a plurality of carbon fiber brushes 54, 74 at corresponding positions. In some embodiments, the plurality of carbon fiber brushes 54 on the negative plate 5 may carry a negative high voltage supplied by the power module 100, and the plurality of carbon fiber brushes 74 on the positive plate 7 may carry a positive high voltage supplied by the power module 100. The negative plate 5 and the positive plate 7 may be printed circuit boards on which copper wires are provided to conduct the power voltage to the positions of the carbon fiber brushes and the plasma needles. The power module 100 may be connected to a conventional power source, such as a 220v power source, which is then converted into a high voltage that is applied to the positive plate 7 and the negative plate 5. In order to generate both negative ions and positive and negative ions, the negative plate 5 may have a voltage greater than that of the positive plate 7, e.g., the voltage of the negative plate 5 is 1.5 to 2.5 times the voltage of the positive plate 7. In some embodiments, the positive plate 7 may have a voltage of positive 5 kV, and the negative plate 5 may have a voltage of negative 10 kV, that is, the voltage of the negative plate 5 is twice the voltage of the positive plate 7. At this time, both negative ions and positive and negative ions are generated between the positive plate 7 and the negative plate 5. The ion generator according to the embodiment of the present invention can simultaneously generate positive and negative ions, negative ions and plasmas. In addition, in the ion generator, the plasma generator and the positive and negative ion generator according to the embodiment of the present invention share the same negative plate 5, which improves the integration of the device and makes the device exceptionally compact, so that it can be mounted in a narrow space on the back side of the middle plate 3.

In some embodiments, as is more clearly shown in FIG. 4, the ground plate 6, the negative plate 5 and the positive plate 7 may be arranged parallel to each other. In some embodiments, the distance between the negative plate 5 and the ground plate 6 is equivalent to the distance between the negative plate 5 and the positive plate 7. For example, both the distances are 40 mm or, as another example, the distance between the negative plate 5 and the ground plate 6 and the distance between the negative plate 5 and the positive plate 7 are both within the range of 30 mm-50 mm. In some embodiments, the ion generator 4 further comprises a first mounting bracket 8 and a second mounting bracket 9 connected to the two ends of the ground plate 6, the negative plate 5 and the positive plate 7, and the power module 100 can be arranged in the first mounting bracket 8 or the second mounting bracket 9. For example, as shown in FIG. 4, in the embodiment, the power module 100 is arranged in the second mounting bracket 9 and is enclosed by the housing of the second mounting bracket 9. In some embodiments, the first mounting bracket 8 and the second mounting bracket 9 are provided with mounting holes 81, 91, so as to fix them to the middle plate 3 by means of bolts.

In some embodiments, the carbon fiber brushes 54, 74 of the negative plate 5 and the positive plate 7 are gathered into bundles by carbon fiber brush protective covers 55, 75, which can be attached to the negative plate 5 and the positive plate 7. As shown in the figures, the carbon fiber brushes 54, 74 on the negative plate 5 and the positive plate 7 are spaced apart by an appropriate distance, thereby generating negative ions and positive and negative ions therebetween. As is more clearly shown in FIG. 3, the ground plate 6 may be provided with openings 61 corresponding to the positions of the plurality of plasma needles 53, thereby generating plasmas. The ground plate 6 may, for example, be made of stainless steel, such as S50C.

In some embodiments, the positions of the plurality of plasma needles 53 on the first side 51 of the negative plate 5 correspond to the positions of the plurality of carbon fiber brushes 54 on the second side 52 of the negative plate 5. Since the negative plate 5 is a printed circuit board, arranging the plasma needles 53 and the carbon fiber brushes 54 on the two sides of the negative plate 5 in corresponding positions can simplify the design and manufacture of the printed circuit board. In some embodiments, the plurality of plasma needles 53 on the first side 51 of the negative plate 5 and/or the plurality of carbon fiber brushes 54 on the second side 52 of the negative plate 5 are evenly arranged at equal intervals, so that plasmas, negative ions and positive and negative ions can be more evenly generated.

According to some aspects, the present invention also aims to protect a fan coil unit comprising the ion generator according to the respective embodiments. The fan coil unit comprises a middle plate 3 with a plurality of holes 31 provided thereon, a motor 1 arranged on the back side of the middle plate 3, volutes 21, 22 arranged on at least one side or both sides of the motor 1, and fan(s) located in at least one volute(s) driven by the motor 1 through the motor shafts 11, 12. Wherein, the ion generator 4 is arranged on the back side of the middle plate 3 and is in alignment with the plurality of holes 31, thereby adding the generated ions into the return air flow through the holes.

According to some aspects, the present invention further aims to protect an air conditioning system comprising the fan coil unit according to the respective embodiments.

The specific embodiments described above are merely intended to describe the principles of the present invention more clearly, wherein various components are clearly shown or described to facilitate the understanding of the principles of the present invention. Those skilled in the art may, without departing from the scope of the present invention, make various modifications or changes to the present invention. Therefore, it should be understood that these modifications or changes should be included within the scope of patent protection of the present invention.

What is claimed is:

1. An ion generator for an air circulation system, comprising:
    a power module;
    a negative plate connected to the power module;
    a ground plate spaced apart from a first side of the negative plate, wherein the first side of the negative plate comprises a plurality of plasma needles extending toward the ground plate; and
    a positive plate spaced apart from a second side of the negative plate, wherein the positive plate is connected to the power module and has a polarity opposite to that of the negative plate,
    and wherein a first side of the positive plate faces the second side of the negative plate,
    wherein each of the first side of the positive plate and the second side of the negative plate is provided with a plurality of carbon fiber brushes;
    wherein the power module applies a positive voltage to the positive plate and applies a negative voltage to the negative plate.

2. The ion generator according to claim 1, wherein the ground plate, the negative plate and the positive plate are arranged as planes parallel to each other.

3. The ion generator according to claim 1, wherein two ends of the ground plate, the negative plate and the positive plate are respectively connected to a first mounting bracket and a second mounting bracket, and the power module is arranged in the first mounting bracket or the second mounting bracket.

4. The ion generator according to claim 1, wherein the carbon fiber brushes of the negative plate and the positive plate are gathered into bundles by carbon fiber brush protective covers.

5. The ion generator according to claim 1, wherein the ground plate is made of a metal material, with openings provided thereon at corresponding positions to the plurality of plasma needles.

6. The ion generator according to claim 1, wherein the positions of the plurality of plasma needles on the first side of the negative plate correspond to the positions of the plurality of carbon fiber brushes on the second side of the negative plate.

7. The ion generator according to claim 1, wherein the plurality of plasma needles on the first side of the negative plate are evenly arranged at equal intervals and/or the plurality of carbon fiber brushes on the second side of the negative plate are evenly arranged at equal intervals.

8. The ion generator according to claim 1, wherein the power module is configured to apply a voltage to the negative plate which is greater than a voltage applied to the positive plate, and optionally, the power module applies a voltage to the negative plate which is 1.5 to 2.5 times the voltage applied to the positive plate.

9. A fan coil unit, wherein the fan coil unit is provided with the ion generator according to claim 1, and the fan coil unit comprises a middle plate, a motor mounted on the middle plate, a volute on at least one side of the motor, and a fan located in the at least one volute driven by the motor, wherein, holes are provided on the middle plate, the ion generator is mounted on an upper side of the motor mounting position on the middle plate, and generated ions are added into an return air flow passing through the holes.

10. An air conditioning system, wherein the air conditioning system comprises the fan coil unit according to claim 9.

* * * * *